Patented Aug. 26, 1930

1,774,310

UNITED STATES PATENT OFFICE

HARRY R. BATES, OF ATLANTA, GEORGIA, ASSIGNOR, BY MESNE ASSIGNMENTS, TO CITRUS COMPOUND CORPORATION, A CORPORATION OF FLORIDA

PROCESSING OF FRUIT TO PREVENT DECAY

No Drawing. Application filed April 19, 1929. Serial No. 356,614.

This invention relates to the preparation of fresh fruit or vegetables by treating them with a solution containing a compound which will retard or prevent blue mold decay or decay caused by other organisms. The invention is especially applicable for the treatment of citrus fruit such as oranges, for example, which are often damaged in gathering and packing by scratching, cutting, abrading or otherwise injuring the rind or skin.

It has been found that in gathering and packing citrus fruit for the market that if the rind or skin is cut or scratched blue mold will enter and cause rapid decay that is apt to spread through the entire batch. A single article of fruit afflicted with blue mold will contaminate wash water to such an extent that the blue mold decay will be caused to take place in a very large number of units of fruit that is washed in the same water, especially if scratches or abrasions, even to a slight degree, are present.

Heretofore attempts have been made to prevent blue mold decay from spreading in fruit that is shipped to long distances by keeping the same cold or shipping it in refrigerator cars, thereby entailing great expense. Also, certain compounds have been suggested for treatment of the fruit, but are not entirely satisfactory, because of the effect of the same upon the fruit or the expense and trouble of treating the fruit with them.

By the present invention fruit is treated with an aqueous solution of a solid compound containing the phosphoric acid radical. The treatment is carried out in such a way that a dry layer or film of the compound remains on the fruit, especially in cuts, scratches or abrasions of the same, thereby inhibiting or preventing spread of the blue mold.

The fruit may be treated with the solution containing the phosphoric acid radical, either by spraying the same upon the fruit or by immersing the fruit in the solution for a few minutes. The fruit may first be brushed or washed to remove adhering matter or dirt or the fruit can be treated with the solution itself both for washing the same and preparing it so that it will not be destroyed rapidly by the blue mold decay.

The solid compound containing the phosphoric acid radical which is dissolved in water for the treatment may be phosphoric acid or salts of phosphoric acid, especially the alkali metal salts. Trisodium phosphate or disodium phosphate have been found to be especially suitable for this purpose.

The most satisfactory results have thus far been obtained in commercial practice by using a solution containing about one pound of trisodium phosphate dissolved in thirty gallons of water. The water is preferably kept at a temperature of about 75° F. to 80° F. and the fruit is kept submerged in the solution for about five minutes.

The fruit may be removed from the solution and sprayed with clear water to wash off the excess solution after which the excess moisture may be dried from the surface and the fruit polished.

Instead of using trisodium phosphate, disodium phosphate may be used with very satisfactory results. The strength of the solution with either disodium phosphate or trisodium phosphate may vary from an approximate saturated solution to a strength of about one pound of the phosphate to fifty gallons of water, and the temperature may vary over wide ranges and the time of treatment is generally shortened with the extent of concentration of the solution.

After the fruit has been treated and the surfaces dried, a protective coating material, such as a thin coating of waxy material, for example, may be applied to aid in preventing shrinkage and maintain the fruit in fresh condition for a longer time.

The use of the word "fruit" in the specification and claims is intended to include both fruit and vegetables and the treatment with the solution containing the phosphoric acid radical is intended not only to inhibit or prevent decay caused by blue mold, but also to prevent decay or rot from other causes, which are remedied by this treatment.

Although the invention has been particularly described in connection with the prevention of blue mold, it is also applicable to the prevention of other molds and decays due to fungi or other organisms which attack citrus fruits, and the claims are intended to include such molds.

I claim:

1. The process of inhibiting blue mold decay which comprises treating fresh fruit with an aqueous solution of a compound containing the phosphoric acid radical in such concentration as will effect inhibition of blue mold decay.

2. The process of inhibiting blue mold decay which comprises treating fresh fruit with an aqueous solution of an alkali metal phosphate in such concentration as will effect inhibition of blue mold decay.

3. The process of inhibiting blue mold decay which comprises treating fresh fruit with an aqueous solution of trisodium phosphate in such concentration as will effect inhibition of blue mold decay.

4. The process of inhibiting blue mold decay which comprises treating citrus fruit with water containing at least 2 per cent of trisodium phosphate.

5. Fresh fruit having on its surfaces a sufficient amount of a compound containing the phosphoric acid radical to render the fruit resistant to blue mold decay.

6. Fresh citrus fruit having in the broken portions of its skin a sufficient amount of an alkali metal phosphate to render it resistant to blue mold decay.

7. Fresh citrus fruit having in the broken portions of its skin a sufficient amount of trisodium phosphate to render the fruit resistant to blue mold decay.

8. Fresh citrus fruit having in the broken portions of its skin a sufficient amount of disodium phosphate to render the fruit resistant to blue mold decay.

HARRY R. BATES.